(12) United States Patent
Kagata et al.

(10) Patent No.: US 10,907,065 B2
(45) Date of Patent: Feb. 2, 2021

(54) INK JET RECORDING METHOD AND INK SET

(71) Applicant: Seiko Epson Corporation, Tokyo (JP)

(72) Inventors: Takayoshi Kagata, Shiojiri (JP); Kenichi Seguchi, Okaya (JP)

(73) Assignee: Seiko Epson Corporation

( * ) Notice: Subject to any disclaimer, the term of this patent is extended or adjusted under 35 U.S.C. 154(b) by 32 days.

(21) Appl. No.: 15/923,298

(22) Filed: Mar. 16, 2018

(65) Prior Publication Data

US 2018/0265725 A1 Sep. 20, 2018

(30) Foreign Application Priority Data

Mar. 17, 2017 (JP) ................. 2017-052567

(51) Int. Cl.
*C09D 11/38* (2014.01)
*B41M 5/00* (2006.01)
(Continued)

(52) U.S. Cl.
CPC ........... *C09D 11/38* (2013.01); *B41M 5/0017* (2013.01); *B41M 5/0023* (2013.01);
(Continued)

(58) Field of Classification Search
CPC ........ B41J 2/1433; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B41J 11/002; B41J 2/01; B41J 2/211; B41J 2/17; B41J 2/17593; B41J 2/2107; B41J 2/1755; B41J 2/2114; B41J 2/2117; B41J 2/2056; B41J 2/21;
(Continued)

(56) References Cited

U.S. PATENT DOCUMENTS

| | | | | |
|---|---|---|---|---|
| 5,889,083 A | * | 3/1999 | Zhu | ............. C09D 11/30 523/161 |
| 6,132,665 A | | 10/2000 | Bui et al. | |

(Continued)

FOREIGN PATENT DOCUMENTS

| | | |
|---|---|---|
| EP | 2412763 A1 | 2/2012 |
| EP | 2752303 A1 | 7/2014 |

(Continued)

OTHER PUBLICATIONS

AAKO; Carnauba Wax Material Safety Data Sheet (MSDS) (Jun. 17, 2009); pp. 1-3 (Year: 2009).*

(Continued)

*Primary Examiner* — Manish S Shah
(74) *Attorney, Agent, or Firm* — Harness, Dickey & Pierce, P.L.C.

(57) ABSTRACT

An ink jet recording method includes applying a reaction solution containing a coagulant for coagulating components of an ink composition onto a recording medium and applying an ink composition onto the recording medium by discharging the ink composition from an ink jet head. The ink composition is an aqueous ink jet composition which contains a first wax having a melting point of 100° C. or higher, a second wax having a melting point of 70° C. or lower, and water.

19 Claims, 1 Drawing Sheet

(51) Int. Cl.
  *B41M 7/00* (2006.01)
  *C09D 11/12* (2006.01)
  *C09D 11/40* (2014.01)
  *C09D 11/322* (2014.01)
  *C09D 11/54* (2014.01)

(52) U.S. Cl.
  CPC ........ *B41M 5/0047* (2013.01); *B41M 5/0064* (2013.01); *B41M 7/009* (2013.01); *C09D 11/12* (2013.01); *C09D 11/322* (2013.01); *C09D 11/40* (2013.01); *C09D 11/54* (2013.01); *B41M 5/0011* (2013.01)

(58) Field of Classification Search
  CPC ...... B41J 2/0057; B41J 3/60; B41J 2002/012; B41J 2/04598; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
  See application file for complete search history.

(56) References Cited

U.S. PATENT DOCUMENTS

| | | | | |
|---|---|---|---|---|
| 2006/0009542 | A1* | 1/2006 | Schmalzl | C09D 123/10 523/160 |
| 2012/0026239 | A1* | 2/2012 | Yanagi | C09D 11/322 347/21 |
| 2012/0040156 | A1* | 2/2012 | Ohashi | C09D 11/322 106/31.13 |
| 2012/0252942 | A1 | 10/2012 | Aoki et al. | |
| 2013/0053485 | A1 | 2/2013 | Misawa et al. | |
| 2014/0232782 | A1* | 8/2014 | Mukai | B41J 2/2107 347/20 |
| 2017/0166768 | A1 | 6/2017 | Matsuzaki et al. | |

FOREIGN PATENT DOCUMENTS

| | | |
|---|---|---|
| JP | 08-132724 A | 5/1996 |
| JP | 2000-309703 A | 11/2000 |
| JP | 2007-277290 A | 10/2007 |
| JP | 2012-025911 A | 2/2012 |
| JP | 2012-214650 A | 11/2012 |
| JP | 2016-193980 A | 11/2016 |
| JP | 2017-110185 A | 6/2017 |
| WO | WO-2011-093486 A1 | 8/2011 |

OTHER PUBLICATIONS

ThermoFisher Scientific; Paraffin Wax Material Safety Data Sheet (MSDS) (Jun. 4, 2010); pp. 1-6. (Year: 2010).*

Industrial Raw Materials LLC; Polyethylene Wax Material Safety Data Sheet (MSDS) (Dec. 12, 2015); pp. 1-6 (Year: 2015).*

Hummel Croton Inc.; Stearic Acid; Procisol Wax Material Safety Data Sheet (MSDS) (Mar. 21, 2018) ; pp. 1-6 (Year: 2018).*

Polimaxx Safety Data Sheet (Jan. 28, 2013); Polyethylene Wax (PE100N) discloses melting point is from 110° C to 140° C (pp. 1-5). (Year: 2013).*

Strahl & Pitsch Material Safety Data Sheet (Aug. 6, 2010) Vegetable Wax (Laurel Wax (SP-9001)) discloses melting point is from 38° C to 46° C (pp. 1-4) (Year: 2010).*

SchoolAR Chemistry (Jan. 23, 2009), Paraffin Wax MSDS discloses melting point is from 47° C to 65° C (pp. 1-2) (Year: 2009).*

Extended European Search Report for Patent Application No. EP 18162035.2 dated Jun. 6, 2018 (6 pages).

* cited by examiner

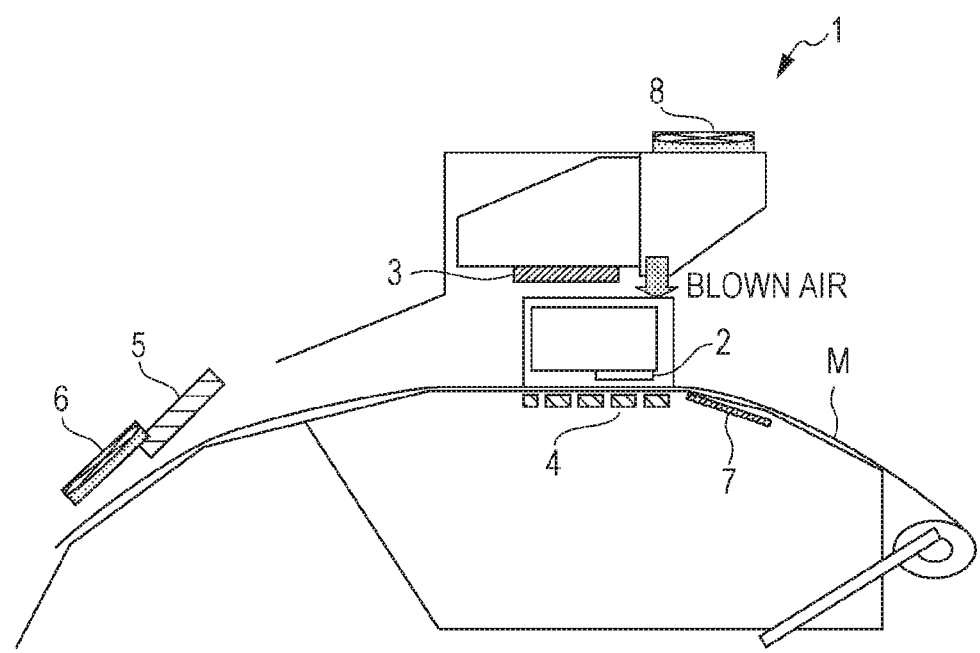

INK JET RECORDING METHOD AND INK SET

BACKGROUND

1. Technical Field

The present invention relates to an ink jet recording method and an ink set.

2. Related Art

An ink jet recording method of recording an image on a recording medium by discharging minute ink droplets from nozzles of a recording head of an ink jet recording apparatus is known. Using such an ink jet recording method in a sign printing field or a high-speed label printing field is also examined. In a case where an image is recorded on a recording medium having low ink absorbency (for example, art paper or coated paper) or on a recording medium having ink non-absorbency (for example, plastic film), using an aqueous resin ink composition (also referred to as "an aqueous ink" or "an ink" below) which contains a resin emulsion, as an ink is examined from a viewpoint of safety for the global environment and the human body. From a view point of improving abrasion resistance of a recorded matter, a material obtaining a wax in the aqueous ink is known.

A technology in which a reaction solution which contains an aqueous ink (including wax particles of two kinds of waxes) and a coagulant for the ink component is used in recording, in order to obtain excellent storage stability with time and to improve blocking resistance just after an image is formed, or abrasion resistance of the image, for example, when recording on a recording medium having low ink absorbency or ink non-absorbency is performed with the aqueous resin ink composition is known (see JP-A-2012-25911, for example).

The reaction solution is used for fixing an ink quickly. However, if components of a pigment or a resin of the ink is coagulated by the reaction solution, there is a tendency to have difficulty in forming a flat film, and abrasion resistance of an image may be decreased.

SUMMARY

An advantage of some aspects of the invention is to provide an ink jet recording method and an ink set for obtaining a recorded matter having excellent abrasion resistance.

The invention can be realized in the following aspects or application examples.

Application Example 1

According to an aspect of the invention, there is provided a recording method which includes applying a reaction solution containing a coagulant for coagulating components of an ink composition onto a recording medium and applying the ink composition onto the recording medium by discharging the ink composition from an ink jet head. The ink composition is an aqueous ink jet composition which contains a first wax having a melting point of 100° C. or higher, a second wax having a melting point of 70° C. or lower, and water.

According to the application example, since the ink jet recording method includes the applying of the reaction solution and the applying of the ink composition, an image having excellent image quality is obtained. Since the ink composition contains a first wax having a melting point of 100° C. or higher and a second wax having a melting point of 70° C. or lower, an image having excellent glossiness and excellent abrasion resistance is obtained in spite of being used along with the reaction solution. Therefore, it is possible to provide an ink jet recording method by which an image obtained is excellent in image quality, abrasion resistance, and glossiness.

Application Example 2

In the ink jet recording method according to the application example, the melting point of the first wax may be from 100° C. to 150° C., and the melting point of the second wax may be from 35° C. to 70° C.

According to the application example, since the melting point of the first wax is from 100° C. to 150° C., and the melting point of the second wax is from 35° C. to 70° C., the above-described effect is enhanced.

Application Example 3

In the ink jet recording method according to the application example, the first wax may be a polyolefin wax, and the second wax may be a paraffin wax.

According to the application example, since the first wax is a polyolefin wax, and the second wax is a paraffin wax, it is possible to set the melting points of the first wax and the second was to be in a proper range. Thus, the image quality of an image is enhanced.

Application Example 4

In the ink jet recording method according to the application example, a ratio of the content of the first wax to the content of the second wax may be from 0.1 to 0.6.

According to the application example, since the ratio of the content of the first wax to the content of the second wax is from 0.1 to 0.6, the abrasion resistance of an image is enhanced.

Application Example 5

In the ink jet recording method according to the application example, the recording medium may have non-absorbency or low absorbency.

According to the application example, in a case where a recording medium having non-absorbency or low absorbency is provided, it is possible to suppress bleeding and to form an image having excellent abrasion resistance.

Application Example 6

In the ink jet recording method according to the application example, the applying of the ink composition may be performed on a heated recording medium.

According to the application example, even in a case where the applying of the ink composition is performed on the heated recording medium, it is possible to provide an ink jet recording method in which an image which is excellent in abrasion resistance and glossiness can be formed and discharge stability is excellent.

Application Example 7

In the ink jet recording method according to the application example, during the applying of the ink composition, the surface temperature of the recording medium may be from 30° C. to 45° C.

According to the application example, during the applying of the ink composition, even in a case where the surface temperature of the recording medium is from 30° C. to 45° C., it is possible to provide an ink jet recording method in which an image which is excellent in abrasion resistance and glossiness can be formed and discharge stability is excellent.

Application Example 8

In the ink jet recording method according to the application example, the melting point of the second wax may be higher than the surface temperature of the recording medium during the applying of the ink composition.

According to the application example, since the melting point of the second wax may be higher than the surface temperature of the recording medium during the applying of the ink composition, it is possible to provide an ink jet recording method in which clogging occurs less frequently and discharge stability is enhanced even though an ink jet head receives some heat platen heating when the ink composition is applied.

Application Example 9

In the ink jet recording method according to the application example, the melting point of the second wax may be very close to but not exceeding 40° C. from the surface temperature of the recording medium during the applying of the ink composition.

According to the application example, since the melting point of the second wax is about but not greater than 40° C. from the surface temperature of the recording medium during the applying of the ink composition, it is possible to provide an ink jet recording method in which clogging occurs less frequently and discharge stability is enhanced even though the ink jet head receives some heat by platen heating when the ink composition is applied.

Application Example 10

The ink jet recording method according to the application example may further include supplemental or secondary heating of the recording medium after the applying of the ink composition.

According to the application example, it is possible to provide an ink jet recording method in which an image which is excellent in abrasion resistance and glossiness can be formed and discharge stability is excellent, even in the ink jet recording method including post ink recording heating of the recording medium.

Application Example 11

In the ink jet recording method according to the application example, the melting point of the first wax may be higher than the surface temperature of the recording medium during the secondary heating of the recording medium.

According to the application example, since the melting point of the first wax is higher than the surface temperature of the recording medium during the secondary heating of the recording medium, it is possible to provide an ink jet recording method in which an image which is excellent in abrasion resistance and glossiness can be formed and discharge stability is excellent.

Application Example 12

In the ink jet recording method according to the application example, the melting point of the second wax may be lower than the surface temperature of the recording medium during the secondary heating of the recording medium.

According to the application example, since the melting point of the second wax is lower than the surface temperature of the recording medium during the secondary heating of the recording medium, it is possible to provide an ink jet recording method in which an image which is excellent in abrasion resistance and glossiness can be formed and discharge stability is excellent.

Application Example 13

In the ink jet recording method according to the application example, the coagulant may include at least one of the group consisting of a polyvalent metal salt, a cationic polymer, and organic acid.

According to the application example, since the coagulant includes at least one of the group consisting of a polyvalent metal salt, a cationic polymer, and organic acid, it is possible to provide an ink jet recording method in which an image which is enhanced in abrasion resistance and glossiness can be formed and discharge stability is excellent.

Application Example 14

According to another aspect of the invention, there is provided an ink set which includes a reaction solution and an aqueous ink jet composition. The reaction solution contains a coagulant for coagulating components of an ink composition. The aqueous ink jet composition is the above-described ink composition and contains a first wax having a melting point of 100° C. or higher, a second wax having a melting point of 70° C. or lower, and water.

According to the application example, since the ink set includes the reaction solution and the aqueous ink jet composition, an image having excellent image quality is obtained. Since the first wax having a melting point of 100° C. or higher and the second wax having a melting point of 70° C. are used together as the ink composition, an image which has excellent glossiness and excellent abrasion resistance in spite of using the reaction solution together is obtained. Therefore, it is possible to provide an ink jet recording method by which an image obtained is excellent in image quality, abrasion resistance, and glossiness.

BRIEF DESCRIPTION OF DRAWING

Embodiments of the invention will be described with reference to the accompanying drawings, wherein like numbers reference like elements.

The FIGURE is a sectional view schematically illustrating an ink jet recording apparatus.

DESCRIPTION OF EXEMPLARY EMBODIMENTS

Hereinafter, a preferred exemplary embodiment of the invention will be described. The exemplary embodiment which will be described below is provided for describing an example of the invention. The invention is not limited to the following exemplary embodiment and also includes various modification examples conducted in a range without departing from the gist of the invention.

According to the exemplary embodiment, an ink jet recording method includes a reaction-solution applying step and an ink-composition applying step. In the reaction-solution applying step, a reaction solution containing a coagulant for coagulating components of an ink composition is applied onto a recording medium. In the ink-composition applying step, the ink composition is applied onto the recording medium by being discharged from an ink jet head. The ink composition is an aqueous ink jet composition which contains a first wax having a melting point of 100° C. or higher, a second wax having a melting point of 70° C. or lower, and water.

Regarding the ink jet recording method according to the exemplary embodiment, an ink jet recording apparatus that performs recording by the recording method, the aqueous ink jet composition (also referred to as "an ink" below), the reaction solution, the recording medium, and the ink jet recording method will be described below in this order.

1. Configurations 1.1. Ink Jet Recording Apparatus

An example of the ink jet recording apparatus in which the recording method according to the exemplary embodiment is performed will be described with reference to the drawing. The ink jet recording apparatus which can be used in the recording method according to the exemplary embodiment is not limited to the following aspects.

An example of an ink jet recording apparatus which can be used as the ink jet recording apparatus used in the exemplary embodiment will be described with reference to the drawing. The FIGURE is a sectional view schematically illustrating the ink jet recording apparatus. As illustrated in the FIGURE, an ink jet recording apparatus 1 includes an ink jet head 2, an IR heater 3, a platen heater 4, a curing heater 5, a cooling fan 6, a preheater 7, and a ventilation fan 8. The ink jet recording apparatus 1 includes a control unit (not illustrated). The control unit controls an operation of the entirety of the ink jet recording apparatus 1.

The ink jet head 2 is a unit that discharges and applies an ink composition onto a recording medium M. Any of a line type ink jet head and a serial type ink jet head may be used as the ink jet head 2.

The ink jet head 2 includes nozzles (not illustrated) that discharge a reaction solution. The reaction solution includes an ink composition and a coagulant for coagulating components of the ink composition. Examples of a method of discharging an ink from the nozzles include a method (electrostatic suction method) in which a strong electric field is applied between the nozzle and an acceleration electrode disposed in the front of the nozzle, an ink of a liquid droplet shape is continuously discharged from the nozzle, and the liquid droplets of the ink are discharged during a time when the liquid droplets fly between deflection electrodes, so as to correspond a recording information signal; a method in which an ink is pressed by a small pump and a quartz vibrator or the like mechanically vibrates nozzles, and thus liquid droplets of the ink are forcibly discharged; a method (piezo type) in which pressure and a recording information signal are applied together to an ink by a piezoelectric element, and liquid droplets of the ink are discharged, and thus recording is performed; and a method (thermal jet type) in which an ink is heated and foamed on a minute electrode in accordance with a recording information signal, and liquid droplets of the ink are discharged, and thus recording is performed.

Here, an ink jet recording apparatus including a serial type ink jet head performs recording by performing scanning (pass) in which an ink jet head for recording discharges the ink composition while moving to be relative to a recording medium, plural number of times. Specific examples of the serial type ink jet head include a case where an ink jet head is mounted on a carriage moving in a width direction of a recording medium (direction intersecting with a transport direction of a recording medium), and liquid droplets are discharged onto the recording medium while the ink jet head moves with the carriage moving.

An ink jet recording apparatus including the line type ink jet head performs recording by performing scanning (pass) in which an ink composition is discharged while an ink jet head for recording is moved to be relative to a recording medium, one time. Specific examples of the line type ink jet head include a case where an ink jet head is configured to have a width which is wider than the width of a recording medium, and the ink jet head discharges liquid droplets on the recording medium without moving the recording head.

In the exemplary embodiment, an ink jet recording apparatus including the serial type ink jet head is used as the ink jet recording apparatus 1, and the ink jet head 2 using the piezo type as the method of discharging an ink from nozzles may be used.

The ink jet recording apparatus 1 includes the IR heater 3 and the platen heater 4 which are provided for heating a recording medium M when the ink composition is discharged from the ink jet head 2 (in the ink-composition applying step). In the exemplary embodiment, when the recording medium M is heated in the ink-composition applying step, at least one of the IR heater 3 and the platen heater 4 may be used.

If the IR heater 3 is used, the recording medium M can be heated from the ink jet head 2 side. Thus, the ink jet head 2 is also easily heated. However, in comparison to a case where the recording medium M is heated from the back surface of the recording medium M by the platen heater 4 or the like, it is possible to increase the temperature without considering the thickness of the recording medium M. If the platen heater 4 is used when the recording medium M is heated, the recording medium M can be heated from the opposite side of the ink jet head 2 side. Thus, it is relatively difficult to also heat the ink jet head 2.

The surface temperature of the recording medium M by heating of the IR heater 3 and the platen heater 4 when ink jet recording (which will be described later) is performed is preferably equal to or lower than 70° C., more preferably equal to or lower than 45° C., further preferably equal to or lower than 40° C., and furthermore preferably equal to or lower than 38° C. Thus, radiant heat received from the IR heater 3 and the platen heater 4 is small or not provided. Accordingly, it is possible to suppress drying of the ink composition in the ink jet head 2 and to suppress variation in a composition ratio of the ink composition. In addition, an occurrence of a situation in which a resin, a wax, or the like is welded (fixed) to the inner wall of the ink jet head 2 is suppressed. The lower limit value of the surface temperature of the recording medium M when ink jet recording is performed is preferably equal to or higher than 30° C., more preferably equal to or higher than 31° C., and further preferably equal to or higher than 32° C. Since the lower limit value of the surface temperature of the recording medium M when ink jet recording is performed is equal to or higher than 30° C., it is possible to quickly dry an ink on the recording medium M, and bleeding is suppressed.

The curing heater 5 dries and cures the ink composition with which recording is performed on the recording medium M (post-heating step). Since the recording medium M on which an image is recorded is heated by the curing heater 5, moisture and the like included in the ink composition is evaporated and dispersed more rapidly, and an ink film is formed by resin fine particles included in the ink composition. In this manner, the ink film is firmly fixed (bonded) on the recording medium M, and thus it is possible to obtain an image which has excellent abrasion resistance and high image quality, in a short time. The surface temperature of the recording medium M when the recording medium M is heated by the curing heater 5 is preferably from 40° C. to 120° C., more preferably from 60° C. to 110° C., and further preferably from 80° C. to 100° C.

The ink jet recording apparatus 1 may include the cooling fan 6. After the ink composition with which recording is performed on the recording medium M is heated and dried by the curing heater 5, if the ink composition on the recording medium M is cooled by the cooling fan 6, it is possible to form an ink film on the recording medium M with high adhesiveness.

The ink jet recording apparatus 1 may include the pre-heater 7 that heats (pre-heats) the recording medium M in advance before the ink composition is discharged to the recording medium M. Further, the recording apparatus 1 may include the ventilation fan 8 for more effectively drying the ink composition applied onto the recording medium M.

1.2. Aqueous Ink Jet Composition

Next, the aqueous ink jet composition used in the ink jet recording method according to the exemplary embodiment will be described. The ink composition used in the exemplary embodiment may contain a first wax having a melting point of 100° C. or higher, a second wax having a melting point of 70° C. or lower, and water. In addition, the ink composition may contain a color material, a resin component, an organic solvent, and a surfactant, for example. Since such an aqueous ink jet composition is used along with the reaction solution (which will be described later) as an ink set, it is possible to obtain an image having excellent abrasion resistance, particularly, in ink jet recording for a recording medium having ink non-absorbency or low ink absorbency (examples and definitions are provided later in the description). Components included in the aqueous ink jet composition in the exemplary embodiment will be described below.

1.2.1. Wax

The aqueous ink jet composition used in the ink jet recording method according to the exemplary embodiment contains a first wax having a melting point of 100° C. or higher, and a second wax having a melting point of 70° C. or lower. Since the aqueous ink jet composition contains the first wax having a melting point of 100° C. or higher, and the second wax having a melting point of 70° C. or lower, it is possible to particularly improve glossiness and abrasion resistance of an image obtained thereby. In particular, even in a case of being used in the ink jet recording method including the reaction-solution applying step and the ink-composition applying step, it is possible to improve abrasion resistance of an image obtained thereby.

The melting point of the first wax is preferably equal to or higher than 110° C., more preferably equal to or higher than 120° C., and further preferably equal to or higher than 130° C. The melting point of the first wax is preferably equal to or lower than 150° C., more preferably equal to or lower than 140° C., and further preferably equal to or lower than 135° C. It is preferable that the melting point of the first wax be higher than the surface temperature of a recording medium in the post-heating step (secondary heating step) after recording. It is more preferable that the melting point of the first wax be higher than the surface temperature of the recording medium in the post-heating step by 10° C. or more.

In the ink jet recording method according to the exemplary embodiment, since the melting point of the first wax included in the aqueous ink jet composition is in the above range, the first wax is not dissolved in recording and in the post-heating step after the recording. In addition, since the second wax is dissolved in the post-heating step and encloses the first wax, abrasion resistance and glossiness of an image obtained thereby are improved.

Since the first wax is not dissolved in recording, it is possible to provide the ink jet recording method in which clogging of the ink jet head is prevented and discharge stability is excellent.

In the ink jet recording method according to the exemplary embodiment, the melting point of the second wax included in the aqueous ink jet composition is preferably equal to or lower than 65° C., more preferably equal to or lower than 63° C., and further preferably equal to or lower than 60° C. The melting point of the second wax is preferably equal to or higher than 35° C., more preferably equal to or higher than 44° C., and further preferably equal to or higher than 50° C. Further, the melting point of the second wax is preferably higher than the surface temperature of the recording medium in the ink-composition applying step. The melting point of the second wax is more preferably higher than but not exceeding 40° C. more than the surface temperature of the recording medium in the ink-composition applying step, further preferably higher than but not exceeding 30° C. more than, furthermore preferably higher than but not exceeding 20° C. more than, much more preferably higher than but not exceeding 10° C. more than, and particularly preferably higher than but not exceeding 5° C. more than.

In the ink jet recording method according to the exemplary embodiment, since the melting point of the second wax included in the aqueous ink jet composition is in the above range, the temperature of the second wax becomes relatively close to the temperature in the ink-composition applying step, and the second wax after ink-composition applying step comes into a slightly-softened state. Thus, it is possible to enclose the first wax with the second wax well in the post-heating step (secondary heating step), and it is presumed that abrasion resistance and glossiness of an image obtained are improved.

Since the melting point of the second wax is high in a range without exceeding 40° C. from the surface temperature of the recording medium in the ink-composition applying step, it is possible to provide an ink jet recording method in which clogging occurs less frequently and discharge stability is enhanced even though the ink jet head is heated by platen heating in the ink-composition applying step.

In order to obtain an ink jet recording method in which clogging of an ink jet head in recording is prevented and discharge stability is excellent, the melting point of the second wax is more preferably higher than the surface temperature of the recording medium in the ink-composition applying step by 5° C. or higher. The melting point of the second wax is further preferably higher by 10° C. or higher, furthermore preferably higher by 20° C. or higher, much preferably higher by 30° C. or higher, and particularly preferably higher by 40° C. or higher.

Here, regarding a heating temperature of the recording medium in the ink-composition applying step, a portion of the wax may start to be softened even though the heating temperature is lower than the melting point of the wax, or a portion of the wax may be not completely dissolved even though the heating temperature is higher than the melting point of the wax. Therefore, the melting point and the heating temperature of the recording medium are not limited to a relationship which is simply referred to be high and low.

In the ink jet recording method according to the exemplary embodiment, examples of the wax included in the aqueous ink jet composition include a paraffin wax and waxes other than the paraffin wax.

The paraffin wax is a so-called petroleum-based wax. Here, paraffin means alkane (generally, chain saturated hydrocarbon of CnH2n+2) having 20 carbon atoms or more. In the exemplary embodiment, the paraffin wax refers to a mixture of hydrocarbon which includes straight-chain paraffinic hydrocarbon (normal paraffin) of 20 to 30 carbon atoms as the main component and iso-paraffin of a small amount and has a molecular weight of 300 to 500. Since the aqueous ink jet composition includes the paraffin wax, a slip property is imparted to a recorded matter and thus abrasion resistance is improved. Since the paraffin wax has water repellency, it is possible to improve water resistance of a recorded matter if the adequate amount of the paraffin wax is provided.

In the exemplary embodiment, it is preferable that the paraffin wax in a fine particle state (that is, emulsion state or suspension state) be included. Since the paraffin wax in the fine particle state is contained, viscosity of the aqueous ink jet composition is easily adjusted to be in a proper range when discharging is performed by the ink jet head, and storage stability and discharge stability of an ink are easily secured.

In a case where the paraffin wax is in the fine particle state, the average particle diameter thereof is preferably from 5 nm to 400 nm, and more preferably from 50 nm to 200 nm, from a viewpoint of securing storage stability and discharge stability of the aqueous ink jet composition.

A commercial product can be used as the paraffin wax. For example, AQUACER537 and AQUACER539 (product names, manufactured by BYK Corporation) are exemplified.

Similar to the paraffin wax, the wax other than the paraffin wax has a function of imparting the slip property to the surface of the formed recorded matter, so as to improve abrasion resistance. It is preferable that the wax other than the paraffin wax in a fine particle state (that is, emulsion state or suspension state) be contained in the aqueous ink jet composition. Thus, viscosity of an ink is easily adjusted to be in a proper range when discharging is performed by the ink jet head, and storage stability and discharge stability of the ink are easily secured.

Examples of components constituting the wax other than the paraffin wax include plant or animal waxes such as a carnauba wax, a candeli wax, a beeswax, a rice wax, and lanolin; petroleum-based waxes such as a microcrystalline wax, a polyethylene wax, an oxidized polyethylene wax, and petrolatum; mineral waxes such as a montan wax and ozokerite; synthetic waxes such as a carbon wax, a Hoechst wax, a polyolefin wax, and stearic acid amide; and natural or synthetic wax emulsion of an α-olefin•maleic anhydride copolymer or a blended wax. The above waxes may be singly used or be used in combination of plural kinds thereof. Among the above waxes, the polyolefin wax is preferable. If the polyolefin wax is added, it is possible to improve slipperiness when a physical contact occurs on an image formed on a recording medium having ink non-absorbency or low ink absorbency, and to improve abrasion resistance of the image.

The polyolefin wax is not particularly limited. Examples of the polyolefin wax include waxes produced from olefin (such as ethylene, propylene, and butylene) or derivatives thereof, copolymers thereof. Specific examples of the polyolefin wax include a polyethylene-based wax, a polypropylene-based wax, and a polybutylene-based wax. Among the above waxes, from a viewpoint in that an occurrence of cracks in an image can be reduced more effectively, the polyethylene-based wax is preferable. The polyolefin wax may be singly used or used in combination of two kinds or more thereof.

As commercial products of the polyolefin wax, CHEMIPEARL series such as "CHEMIPEARL W4005" (manufactured by Mitsui Chemicals, Inc., polyethylene-based wax, particle diameter of 200 nm to 800 nm, ring and ball method softening point of 110° C., penetration method hardness of 3, and solid content of 40%) are exemplified. In addition, AQUACER series such as AQUACER513 (polyethylene-based wax, particle diameter of 100 nm to 200 nm, melting point of 130° C., and solid content of 30%), AQUACER507, AQUACER515, and AQUACER840 (above, manufactured by BYK Corporation), HITEC E-7025P, HITEC E-2213, HITEC E-9460, HITEC E-9015, HITEC E-4A, HITEC E-5403P, and HITEC E-8237 (above, manufactured by TOHO CHEMICAL INDUSTRY Co., Ltd.), and NOPCOAT PEM-17 (manufactured by SAN NOPCO LIMITED, polyethylene emulsion, and particle diameter of 40 nm). The above materials are commercially available polyolefin waxes in a form of an aqueous emulsion in which the polyolefin wax is dispersed in water. The aqueous emulsion itself may be directly added to an ink composition.

The average particle diameter of the polyolefin wax is preferably from 10 nm to 800 nm, more preferably from 40 nm to 600 nm, and particularly preferably from 150 nm to 300 nm. Since the average particle diameter of the polyolefin wax is in the above range, it is possible to reduce cracks in the formed image and to improve abrasion resistance. In addition, it is possible to cause both kinds of capability, that is, discharge stability of the ink jet head and abrasion resistance of the formed image, to satisfy high criteria.

The average particle diameter of the wax can be measured by a particle size distribution measuring device which uses a laser diffraction scattering method as the measuring principle. As the particle size distribution measuring device, for example, a particle size distribution meter (for example, "MICROTRAC UPA" manufactured by NIKKISO CO., LTD.) which uses a dynamic light scattering method as the measuring principle.

In the exemplary embodiment, it is preferable that the first wax is a polyolefin wax, and the second wax is a paraffin wax. Since the first wax is a polyolefin wax, and the second wax is a paraffin wax, it is possible to set the melting points of the first wax and the second wax to be respectively in desired ranges, and further to improve image quality of an image.

The melting point of each of the waxes may be adjusted by changing the molecular weight or the type of each component of the wax. The two kinds of waxes of the first wax and the second wax are prepared in a manner that a mixed wax emulsion is obtained by mixing two kinds of wax emulsion solutions or emulsion of wax fine particles formed of the two kinds of waxes is prepared.

In the exemplary embodiment, the ratio of the content of the first wax to the content of the second wax is preferably equal to or greater than 0.1, more preferably equal to or greater than 0.2, and further preferably equal to or greater than 0.3. The ratio of the content of the first wax to the content of the second wax is preferably equal to or smaller than 0.6, more preferably equal to or smaller than 0.5, and further preferably equal to or smaller than 0.4. Since the ratio of the content of the first wax to the content of the second wax is from 0.1 to 0.6, abrasion resistance of an image is enhanced and discharge stability is more easily secured.

The content of the first wax is preferably from 0.01 mass % to 10 mass %, more preferably from 0.04 mass % to 5.0 mass %, and further preferably from 0.08 mass % to 1.0 mass %, in terms of the solid content, with respect to the total mass (100 mass %) of the aqueous ink jet composition. In a case where the content of the first wax is in the above range, the above-described effects are sufficiently exhibited.

The content of the second wax is preferably from 0.1 mass % to 3 mass %, and more preferably from 0.1 mass % to 1.5 mass %, in terms of the solid content, with respect to the total mass (100 mass %) of the aqueous ink jet composition. Since the content of the second wax is in the above range, it is possible to form an image which is excellent in abrasion resistance, blocking resistance, and water resistance, on a recording medium having ink non-absorbency or low ink absorbency. Further, clogging is prevented, and discharge stability is improved.

1.2.2. Water

In the exemplary embodiment, the aqueous ink jet composition contains water. Water is the main medium of the aqueous ink jet composition and is a component which is evaporated and dispersed by heating. As the water, ion exchanged water, ultrafiltered water, reverse osmosis water, pure water such as distilled water, or water (such as ultra pure water) obtained by strictly removing ionic impurities is preferable. If water sterilized by UV irradiation, addition of hydrogen peroxide, or the like is used, it is possible to suppress molds or bacteria in a case where a pigment dispersion liquid and an ink composition using the pigment dispersion liquid are stored for a long term. Thus, this is preferable.

The content of water is preferably equal to or greater than 50 mass %, more preferably equal to or greater than 60 mass %, and particularly preferably equal to or greater than 70 mass %, with respect to the total mass (100 mass %) of the aqueous ink jet composition.

1.2.3. Color Material

The aqueous ink jet composition used in the exemplary embodiment may contain a color material.

As the color material, dyes or pigments may be exemplified. In order to obtain a property which has difficulty in being discolored by light, a gas, or the like, the pigments are preferably used. Therefore, an image formed on a recording medium having ink non-absorbency or low ink absorbency, by using the pigment, is excellent in water resistance, gas resistance, light fastness, and the like and has favorable storability.

The pigment which is usable in the exemplary embodiment is not particularly limited, and an inorganic pigment or an organic pigment is exemplified. As the inorganic pigment, carbon black produced by well-known methods such as a contact method, a furnace method, and a thermal method may be used in addition to titanium oxide and iron oxide. As the organic pigment, azo pigments (including azo lake, an insoluble azo pigment, a condensed azo pigment, a chelate azo pigment, and the like), polycyclic pigments (for example, a phthalocyanine pigment, a perylene pigment, a perinone pigment, an anthraquinone pigment, and a quinophthalone pigment), a nitro pigment, a nitroso pigment, aniline black, and the like may be used.

Among specific examples of the pigment which is usable in the exemplary embodiment, carbon black is exemplified as a black pigment. Carbon black is not particularly limited. Examples of the carbon black include furnace black, lamp black, acetylene black, channel black, and the like (C.I. Pigment Black 7). Examples of commercial products of the carbon black include No. 2300, 900, MCF88 No. 20B, No. 33, No. 40, No. 45, No. 52, MA7, MA8, MA77, MA100, No. 2200B, and the like (all described above commercial products, manufactured by Mitsubishi Chemical Corporation), Carbon Black FW1, FW2, FW2V, FW18, FW200, 5150, 5160, and S170, PRINTEXT 35, U, V, and 140U, SPECIAL BLACK 6, 5, 4A, 4, and 250 (all described above commercial products, manufactured by Evonik Corporation), CONDUCTEX SC, RAVEN 1255, 5750, 5250, 5000, 3500, 1255, and 700 (all described above commercial products, manufactured by Columbian Carbon Company), REGALE 400R, 330R, and 660R, MOGUL L, MONARCH 700, 800, 880, 900, 1000, 1100, 1300, and 1400, and ELFTEX 12 (all described above commercial products, manufactured by Cabot Corporation).

A white pigment is not particularly limited. Examples of the white pigment include C.I. Pigment White 6, 18, and 21, and white inorganic pigments of titanium oxide, zinc oxide, zinc sulfide, antimony oxide, magnesium oxide, and zirconium oxide. In addition to such white inorganic pigments, white organic pigments such as white hollow resin particles and white polymer particles may be used.

A pigment used in a yellow ink is not particularly limited. Examples of this pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A pigment used in a magenta ink is not particularly limited. Examples of this pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

A pigment used in a cyan ink is not particularly limited. Examples of this pigment include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

A pigment used in a color ink except for magenta, cyan, and yellow is not particularly limited. Examples of this pigment include C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

A pearl pigment is not particularly limited. Examples of the pearl pigment include pigments such as titanium dioxide-coated mica, fish scale foil, and bismuth oxychloride, which has pearl luster or interference gloss.

A metallic pigment is not particularly limited. Examples of the metallic pigment include particles formed of simple substances or alloys such as aluminum, silver, gold, platinum, nickel, chromium, tin, zinc, indium, titanium, and copper.

The content of the color material included in the ink composition is preferably from 1.5 mass % to 10 mass % and more preferably from 2 mass % to 7 mass %, with respect to the total mass (100 mass %) of the aqueous ink jet composition.

In order to apply the above pigments to the aqueous ink jet composition, it is important for the pigment to be stably dispersed and held in water. As a method for stable dispersion, the following methods are exemplified: a method of being dispersed by a resin dispersant such as a water-soluble resin or a water dispersible resin (pigment dispersed by this method is referred to as "a resin dispersion pigment" below); a method of being dispersed by a surfactant of a water-soluble surfactant and/or a water dispersible surfactant (pigment dispersed by this method is referred to as "a surfactant dispersion pigment" below); and a method of chemically and physically putting a hydrophilic functional group into the surface of a pigment particle, so as to allow being dispersed and/or dissolved in water by a dispersant such as the resin or the surfactant (pigment dispersed by this method is referred to as "a surface-treated pigment" below).

In the exemplary embodiment, the ink composition can use any of the resin dispersion pigment, the surfactant dispersion pigment, and the surface-treated pigment. If desired, a form in which plural kinds of the above pigments are mixed can be used.

As the resin dispersant used in the resin dispersion pigment, the followings are exemplified: polyvinyl alcohols, polyvinyl pyrrolidones, polyacrylic acid, acrylic acid-acrylonitrile copolymers, vinyl acetate-acrylic acid copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymer, and salts thereof. Among the above materials, in particular, a copolymer of a monomer having a hydrophobic functional group and a monomer having a hydrophilic functional group, and a polymer formed of a monomer having both a hydrophobic functional group and a hydrophilic functional group are preferable. As the form of the copolymer, any of a random copolymer, a block copolymer, an alternating copolymer, and a graft copolymer can be used.

As the above-described salts, salts with basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, and morpholine are exemplified. The added amount of the basic compounds is not particularly limited so long as the added amount thereof is equal to or greater than the neutralization equivalent of the resin dispersant.

The molecular weight of the resin dispersant is in a range of 1,000 to 100,000 and more preferably in a range of 3,000 to 10,000, in terms of a weight average molecular weight. Since the molecular weight is in the above range, stable dispersion of the color material in water is obtained, and viscosity control, and the like when being applied to the ink composition are easily performed.

Commercial products can be used as the above-described resin dispersant. Specifically, JONCRYL 67 (weight average molecular weight of 12,500, and acid value of 213), JONCRYL 678 (weight average molecular weight of 8,500, and acid value of 215), JONCRYL 586 (weight average molecular weight of 4,600, and acid value of 108), JONCRYL 611 (weight average molecular weight of 8,100, and acid value of 53), JONCRYL 680 (weight average molecular weight of 4,900, and acid value of 215), JONCRYL 682 (weight average molecular weight of 1,700, and acid value of 238), JONCRYL 683 (weight average molecular weight of 8,000, and acid value of 160), JONCRYL 690 (weight average molecular weight of 16,500, and acid value of 240) (all described product names, manufactured by BASF SE).

As the surfactant used in the surfactant dispersion pigment, the followings are exemplified: anionic surfactants such as alkane sulfonate, α-olefin sulfonate, alkyl benzene sulfonate, alkyl naphthalene sulfonate, acyl methyl taurate, dialkyl sulfosuccinate, alkyl sulfuric acid ester salt, sulfated olefin, polyoxyethylene alkyl ether sulfuric acid ester salts, alkyl phosphoric acid ester salts, polyoxyethylene alkyl ether phosphoric acid ester salts, and monoglyceride phosphoric acid ester salts; amphoteric surfactants such as alkyl pyridium salts, alkyl amino acid salts, and alkyl dimethyl betaine; and nonionic surfactants such as polyoxyethylene alkyl ether, polyoxyethylene alkyl phenyl ether, polyoxyethylene alkyl ester, polyoxyethylene alkyl amide, glycerin alkyl ester, and sorbitan alkyl ester.

The added amount of the resin dispersant or the surfactant with respect to the pigment is preferably from 1 part by mass to 100 parts by mass, and more preferably from 5 parts by mass to 50 parts by mass, with respect to 100 parts by mass of the pigment. Since the added amount thereof is in the above range, it is possible to secure dispersion stability of the pigment in water.

Regarding the surface-treated pigment, as the hydrophilic functional group, —OM, —COOM, —CO—, —SP3M, SO2NH3, —RSO3M, —PO3HM, —PO3M3, —SO3NHCOR, —NH3, and —NR3 (in Formula, M indicates a hydrogen atom, alkali metal, ammonium, or organic ammonium, R indicates an alkyl group having 1 to 12 carbon atoms, a phenyl group which may have a substituent, or a naphthyl group which may have a substituent) are exemplified. The functional group is physically and/or chemically put into the surface of the pigment particle by being grafted directly or with another group interposed. As a polyvalent group, an alkylene group having 1 to 12 carbon atoms, a phenylene group which may have a substituent, and a naphthylene group which may have a substituent can be exemplified.

As the surface-treated pigment, a pigment which is surface-treated in a manner that —SO3M and/or —RSO3M (M is a counter ion and indicates a hydrogen ion, an alkali metal ion, an ammonium ion, or an organic ammonium ion) is chemically bonded to the surface of the pigment particle by a treatment agent including sulfur is preferable. That is, the pigment which is surface-treated in a manner that the pigment is dispersed in a solvent, and then —SO3M and/or —RSO3M is chemically bonded to the surface of the pigment particle by amide sulfate or a complex of sulfur trioxide and tertiary amine, and thus is capable of being dispersed and/or dissolved in water is preferable. The solvent does not have an active proton and reactivity with sulfonic acid, and thus the pigment is insoluble or poorly soluble.

As a surface treatment unit configured to cause the functional group or the salt thereof to be grafted to the surface of the pigment particle directly or with a polyvalent group interposed, various well-known surface treatment units can be applied. For example, the following units are exemplified: a unit to cause ozone and a sodium hypochlorite solution to react with commercial oxidized carbon black and to oxidize the carbon black such that the surface is more hydrophilic (for example, JP-A-7-258578, JP-A-8-3498, JP-A-10-120958, JP-A-10-195331, and JP-A-10-237349); a unit to treat carbon black with 3-amino-N-alkyl substituted pyridium bromide (for example, JP-A-10-195360 and JP-A-10-330665); a unit to disperse an organic pigment in a solvent in which the organic pigment is insoluble or poorly soluble, and to put a sulfone group into the surface of the pigment particle by a sulfonating agent (for example, JP-A-8-283596, JP-A-10-110110, and JP-A-10-110111); and a unit to disperse an organic pigment in a basic solvent that forms a complex along with sulfur trioxide, to treat the surface of the organic pigment by adding sulfur trioxide, and to put a sulfone group or a sulfonamino group (for example, JP-A-10-110114). A producing unit for the surface-treated pigment used in the invention is not limited to the above-described units.

The functional group grafted to one pigment particle may be the single kind or plural kinds. The kind of the grafted functional group and the grafted amount of the functional group may be appropriately determined considering dispersion stability in an ink, color density, dryability on a surface in the front of the ink jet head.

Regarding the method of dispersing the resin dispersion pigment, the surfactant dispersion pigment, and the surface-treated pigment which are described above, in water, a pigment, water, and the resin dispersant in a case of the resin dispersion pigment, a pigment, water, and a surfactant in a case of the surfactant dispersion pigment, and the surface-treated pigment and water in a case of the surface-treated pigment, and if desired, a water-soluble organic solvent, a neutralizer, and the like are added. The resultant can be dispersed in a dispersing machine used in the related art, such as a ball mill, a sand mill, an attritor, a roll mill, an agitator mill, a HENSCHEL mixer, a colloid mill, an ultrasonic homogenizer, a jet mill, and an Ong mill. In this case, from a point of securing dispersion stability of the pigment in water, it is preferable that dispersing be performed until the average particle diameter as the particle diameter of the pigment comes in a range of 20 nm to 500 nm, and more preferably in a range of 50 nm to 200 nm.

1.2.4. Resin Particle

In the exemplary embodiment, the aqueous ink jet composition may contain a water-soluble and/or water-insoluble resin component, along with the wax. The resin particle exhibits an effect of improving abrasion resistance by forming a resin film with the wax in the post-heating step of a recording medium (which will be described later) and fixing an image on the recording medium. Thus, the resin particle is preferably a thermoplastic resin particle. The recorded matter obtained by recording with the aqueous ink jet composition including resin particles has excellent abrasion resistance on the recording medium having ink non-absorbency or low ink absorbency, by this effect.

It is preferable that the resin particle in a fine particle state (that is, emulsion state or suspension state) be contained in the aqueous ink jet composition. Since the resin particle in the fine particle state is contained, viscosity of the aqueous ink jet composition is easily adjusted to be in a proper range when discharging is performed by the ink jet head, and storage stability and discharge stability of an ink are easily secured. In this specification, "the resin" refers to a substance which is formed of a natural or synthesized polymer, preferably formed of the synthesized polymer, and exhibits plasticity in a predetermined state.

As the resin component, in addition to a resin used as the resin dispersant, the followings are exemplified: oolyacrylic acid ester or copolymers thereof; polymethacrylic acid ester or copolymers thereof; polyacrylonitrile or copolymers thereof; polycyanoacrylate, polyacrylamide, polyacrylic acid, polymethacrylic acid, polyethylene, polypropylene, polybutene, polyisobutylene, polystyrene, or copolymers thereof; a petroleum resin, a chromane•indene resin, a terpene resin, polyvinyl acetate, or copolymers; polyvinyl alcohol, polyvinyl acetal, polyvinyl ether, polyvinyl chloride, or copolymers thereof; polyvinylidene chloride, fluororesin, fluororubber, polyvinylcarbazole, polyvinylpyrrolidone, or copolymers; polyvinyl pyridine, polyvinyl imidazole, polybutadiene, or copolymers; and polychloroprene, polyisoprene, and a natural resin. Among the above substances, the substance which has a hydrophobic portion and a hydrophilic portion together in a molecular structure is particularly preferable.

In order to obtain the resin particle in the fine particle state, the resin particle is obtained by methods as follows. Any method of the following methods may be applied, and, if desired, a combination of a plurality of methods may be applied. As the methods, a method of mixing a polymerization catalyst (polymerization initiator) and a dispersant in a monomer constituting a desired resin component and performing polymerization (that is, emulsion-polymerization), a method of obtaining the resin particle in a manner that a resin component having a hydrophilic portion is dissolved in a water-soluble organic solvent and the resultant is mixed in water, and then the water-soluble organic solvent is removed by, for example, distillation, a method of obtaining the resin particle in a manner that a resin component is dissolved in a water-insoluble organic solvent, and the resultant is mixed in an aqueous solution along with a dispersant, and the like are exemplified. The above methods can be appropriately selected in accordance with the type and characteristics of a resin component to be used. The dispersant that can be used when the resin component is dispersed is not particularly limited. The following dispersants are exemplified: an anionic surfactant (for example, sodium dodecylbenzenesulfonate, sodium lauryl phosphate, and polyoxyethylene alkyl ether sulfate ammonium salt); and a nonionic surfactant (for example, polyoxyethylene alkyl ether, polyoxyethylene alkyl ester, polyoxyethylene sorbitan fatty acid ester, and polyoxyethylene alkyl phenyl ether). The dispersants can be singly used or be used in a mixture of two kinds or more thereof.

In a case where the resin particle as described above is used in the fine particle state (emulsion state, suspension state), dispersants obtained by well-known materials and methods can be used. For example, dispersants disclosed in JP-B-62-1426, JP-A-3-56573, JP-A-3-79678, JP-A-3-160068, and JP-A-4-18462 may be used. Commercial products can be used. For example, MICROGEL E-1002 and MICROGEL E-5002 (above product names, manufactured by NIPPONPAINT Co., Ltd.), VONCOAT 4001 and VONCOAT 5454 (above product names, manufactured by DIC Corporation), SAE1014 (product name, manufactured by ZEON Corporation), SAIBINOL SK-200 (product name, manufactured by Saiden Chemical Industry Co., Ltd.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (all described product names, manufactured by BASF SE).

In a case where the resin particle is used in the fine particle state, from a viewpoint of securing storage stability and discharge stability of the ink composition, the average particle diameter thereof is preferably in a range of 5 nm to 400 nm, and more preferably in a range of 50 nm to 200 nm. Since the average particle diameter of the resin fine particle is in the above range, it is possible to obtain excellent film forming properties and to reduce clogging in nozzles because it is hard to form a large lump by coagulation.

In a case using the resin particle, the glass transition point thereof is preferably from 25° C. to 100° C., more preferably from 40° C. to 95° C., and further preferably from 50° C. to 90° C. The glass transition point of the resin particle is preferably higher than the surface temperature of a recorded matter in the ink-composition applying step. The glass transition point of the resin particle is preferably lower than the surface temperature of a recording medium in the post-heating step (secondary heating step). Since the glass transition point of the resin particle is in the above range, it is possible to cause discharge stability of the ink jet head and abrasion resistance of the formed image to satisfy high criteria. The glass transition point of the resin particle can be measured based on JIS K7121 by a differential scanning calorimetry method (DSC method).

In a case where the resin particle and the wax which are described above are used together, the reason of obtaining favorable abrasion resistance of a recorded matter is presumed as follows. The component constituting the resin particle has favorable hydrophilicity for a recording medium having ink non-absorbency or low ink absorbency, and an insoluble color material. Thus, the resin particle is firmly fixed on the recording medium while the color material is enclosed, when a resin film is formed in the post-heating step of a recording medium (which will be described later). The wax is also provided on the surface of a resin film. Since the second wax has a melting point lower than that of the first wax, an action of sliding with covering the surface of the first wax occurs. Thus, it is presumed that abrasion resistance on a recorded surface is improved. Since the first wax has an average particle diameter which is greater than that of the color material and is provided on the surface of the resin film, characteristics of reducing frictional resistance on the surface of the resin film are provided. Thus, it is presumed that it is possible to form a resin film having difficulty in being chipped off by rubbing from the outside, and being peeled from the recording medium, and abrasion resistance of a printed matter is improved.

The content of the resin component is preferably from 0.1 mass % to 15 mass %, more preferably from 0.5 mass % to 10 mass %, further preferably from 2 mass % to 7 mass %, and particularly preferably from 3 mass % to 5 mass %, in terms of the solid content, with respect to the total mass (100 mass %) of the ink. Since the content of the resin component is in the above range, it is possible to solidify and fix an ink even on a recording medium having ink non-absorbency or low ink absorbency.

1.2.5. Organic Solvent

In the exemplary embodiment, the aqueous ink jet composition may contain the organic solvent.

Since the ink composition contains the organic solvent, it is possible to obtain favorable dryability of the aqueous ink jet composition discharged onto a recording medium, and to obtain an image having excellent abrasion resistance.

As the organic solvent used in the ink composition, a water-soluble organic solvent is preferable. Since the water-soluble organic solvent is used, it is possible to obtain more favorable dryability of the ink composition, and to obtain an image having excellent abrasion resistance.

The water-soluble organic solvent is not particularly limited. Examples of the water-soluble organic solvent include alcohols such as methanol, ethanol, and isopropyl alcohol; ketones or keto alcohols such as acetone or diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycol, such as ethylene glycol monomethyl ether, diethylene glycol monomethyl ether, diethylene glycol monoethyl ether, and diethylene glycol monobutyl ether; amines having a hydroxyl group, such as diethanolamine and triethanolamine; and glycerin. From a point of improving dryability of the aqueous ink jet composition, among the above substances, propylene glycol, 1,2-hexanediol, 1,3-butanediol, and the like are preferably used.

The content of the water-soluble organic solvent is preferably from 5.0 mass % to 40 mass %, more preferably from 10 mass % to 35 mass %, and particularly preferably from 15 mass % to 30 mass %, with respect to the total mass (100 mass %) of the aqueous ink jet composition.

In the exemplary embodiment, from a point of obtaining a recorded matter having excellent abrasion resistance, it is preferable that the organic solvent used in the aqueous ink jet composition include a nitrogen-containing solvent. More specific examples of the nitrogen-containing solvent include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The nitrogen-containing solvent acts as a favorable dissolvent of a thermoplastic resin.

The organic solvent having a boiling point of 280° C. or higher may absorb moisture of an ink and thus thicken an ink in the vicinity of the ink jet head. Thus, discharge stability of the ink jet head may be decreased. Therefore, in the exemplary embodiment, in the aqueous ink jet composition, the content of the organic solvent having a standard boiling point of 280° C. or higher is preferably equal to or smaller than 3 mass %, more preferably equal to or smaller than 2 mass %, more preferably equal to or smaller than 1 mass %, further preferably equal to or smaller than 0.5 mass %. In this case, since dryability of the ink composition on a recording medium is high, it is possible to form an excellent image in which bleeding is suppressed. Stickiness of the obtained recorded matter is reduced, and abrasion resistance is excellent.

Examples of the organic solvent having a boiling point of 280° C. or higher can include glycerin.

Since glycerin has high hygroscopicity and a high boiling point, glycerin may act as a cause of clogging of the ink jet head or a cause of operation failure. Since glycerin has poor antiseptic properties and easily breeds molds and fungi, it is preferable that glycerin be not contained in the ink composition.

1.2.6. Surfactant

In the exemplary embodiment, the aqueous ink jet composition preferably contains the surfactant. The surfactant is not particularly limited, and examples of the surfactant include an acetylene glycol-based surfactant, a fluorine-based surfactant, and a silicone-based surfactant. It is preferable that the aqueous ink jet composition contain at least one kind of the above surfactants.

The acetylene glycol-based surfactant is not particularly limited. For example, at least one kind or more selected from 2,4,7,9-tetramethyl-5-decyne-4,7-diol and an alkylene oxide adduct of 2,4,7,9-tetramethyl-5-decyne-4,7-diol, 2,4-dimethyl-5-decyn-4-ol and an alkylene oxide adduct of 2,4-dimethyl-5-decyn-4-ol are preferable. Commercial products of the acetylene glycol-based surfactant are not particularly limited. For example, OLFINE 104 series or E series such as OLFINE E1010 (product names, manufactured by Air Products and Chemicals, Inc.), SURFYNOL 465, SURFYNOL 61, and SURFYNOL DF110D (product names, manufactured by Nissin Chemical co., ltd.) are exemplified. The acetylene glycol-based surfactant may be singly used or may be used in combination of two kinds or more thereof.

The fluorine-based surfactant is not particularly limited. Examples of the fluorine-based surfactant include perfluoroalkyl sulfonate, perfluoroalkyl carboxylate, perfluoroalkyl phosphoric acid ester, perfluoroalkyl ethylene oxide adducts, perfluoroalkyl betaine, and perfluoroalkyl amine oxide compounds. Commercial products of the fluorine-based surfactant are not particularly limited. For example, SURFLON 5144 and 5145 (above product names, manufactured by AGC SEIMI CHEMICAL CO., LTD.); FLUORAD FC-170C, FC-430, and FC-4430 (above product names, manufactured by 3M Japan Ltd.); FSO, FSO-100, FSN, FSN-100, and FS-300 (above product names, manufactured by Dupont Corporation); and FT-250 and 251 (above product names, manufactured by NEOS COMPANY LIMITED) are exemplified. The fluorine-based surfactant may be singly used or may be used in combination of two kinds or more thereof.

The silicone-based surfactant is not particularly limited. Examples of the silicone-based surfactant include polysiloxane-based compounds and polyether-modified organosiloxane. Commercial products of the silicone-based surfactant are not particularly limited. Specifically, BYK-306, BYK-307, BYK-333, BYK-341, BYK-345, BYK-346, BYK-347, BYK-348, and BYK-349 (above product names, manufactured by BYK Additives & Instruments Corporation), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (above product names, manufactured by Shin-Etsu Chemical Co., Ltd.) are exemplified.

Among the above substances, the acetylene glycol-based surfactant can further improve clogging recoverability of nozzles. The fluorine-based surfactant and the silicone-based surfactant are preferable from a point of having an action of being uniformly spread on a recording medium such that density variation and bleeding of an ink does not occur. Thus, in the exemplary embodiment, it is more preferable that the aqueous ink jet composition contain the acetylene glycol-based surfactant and at least one of the silicone-based surfactant and the fluorine-based surfactant.

The lower limit of the content of the acetylene glycol-based surfactant is preferably equal to or greater than 0.1 mass %, more preferably equal to or greater than 0.3 mass %, and particularly preferably equal to or greater than 0.5 mass %, with respect to the total mass (100 mass %) of the aqueous ink jet composition. The upper limit of the content thereof is preferably equal to or smaller than 5 mass %, more preferably equal to or smaller than 3 mass %, and particularly preferably equal to or smaller than 2 mass %. If the content of the acetylene glycol-based surfactant is in the above range, the effect of improving clogging recoverability of nozzles is easily obtained.

The lower limit of the content of the fluorine-based surfactant and the silicone-based surfactant is preferably equal to or smaller than 0.5 mass %, and more preferably equal to or smaller than 0.8 mass %. The upper limit of the content thereof is preferably equal to or smaller than 5 mass %, and more preferably equal to or smaller than 3 mass %. If the content of the fluorine-based surfactant and the silicone-based surfactant is in the above range, this is preferable from a point of having an action of being uniformly spread on a recording medium such that density variation and bleeding of an ink does not occur.

1.2.7. Other Contained Components

In the exemplary embodiment, the aqueous ink jet composition may further contain a pH adjuster, an antiseptic agent or antifungal agent, a rust inhibitor, a chelating agent, and the like. If these materials are added, it is possible to further improve characteristics of the aqueous ink jet composition.

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the antiseptic agent or antifungal agent include sodium benzoate, sodium pentachlorophenol, sodium 2-pyridinethiol-1-oxide, sodium sorbate, sodium dehydroacetate, and 1,2-dibenzisothiazolin-3-one. As commercial products thereof, PROXEL XL2 and PROXEL GXL (above product names, manufactured by Avecia Corporation), DENICIDE CSA and NS-500W (above product names, manufactured by Nagase ChemteX Corporation) are exemplified.

Examples of the rust inhibitor include benzotriazole.

Examples of the chelating agent include ethylenediaminetetraacetic acid and salts thereof (ethylenediaminetetraacetic acid disodium salt and the like).

1.2.8. Preparing Method of Aqueous Ink Jet Composition

The aqueous ink jet composition used in the exemplary embodiment is obtained in a manner that the above-described components are mixed in any order, and if desired, impurities are removed by filtration or the like. As a method of mixing the components, a method of sequentially adding materials to a container including a stirring device such as a mechanical stirrer or a magnetic stirrer, and of stirring and mixing the added materials is suitably used. As a filtration method, centrifugal filtration, filtration with a filter, and the like can be performed.

1.2.9. Physical Properties of Aqueous Ink Jet Composition

Regarding the aqueous ink jet composition used in the exemplary embodiment, from a viewpoint of balance between image quality and reliability as an ink for ink jet recording, surface tension at 20° C. is preferably from 20 mN/m to 40 mN/m, and more preferably from 20 mN/m to 35 mN/m. The surface tension can be measured, for example, by using an automatic surface tension meter CBVP-Z (product name, manufactured by Kyowa Interface Science Co., LTD.) and by confirming surface tension when a platinum plate is wet with an ink under an environment of 20° C.

From a similar viewpoint, viscosity of the aqueous ink jet composition used in the exemplary embodiment, at 20° C., is preferably from 3 mPa·s to 10 mPa·s, and more preferably from 3 mPa·s to 8 mPa·s. The viscosity can be measured under an environment of 20° C., for example, by using a viscoelasticity testing machine MCR-300 (product name, manufactured by Pysica Corporation).

1.3. Reaction Solution

Next, the reaction solution used in the ink jet recording method (which will be described later) will be described. The reaction solution used in the exemplary embodiment constitutes an ink set with the above-described aqueous ink jet composition and contains a coagulant for coagulating the components of the aqueous ink jet composition. Components included in the reaction solution used in the exemplary embodiment, and components which may be included in the reaction solution will be specifically described below.

In the exemplary embodiment, the reaction solution is an auxiliary liquid for the above-described aqueous ink jet composition used for coloring a recording medium. The reaction solution is used in a state of being applied to the recording medium before the aqueous ink jet composition is applied. In the reaction solution, the content of the color material is equal to or smaller than 0.2 mass %.

1.3.1. Coagulant

The reaction solution used in the exemplary embodiment contains the coagulant for coagulating the components of the ink composition. Since the reaction solution includes the coagulant, the coagulant and the resin included in the aqueous ink jet composition are quickly caused to react with each other in the ink-composition applying step (which will be described later). If the reaction occurs, a dispersion state of the color material or the resin in the aqueous ink jet composition is broken and the color material or the resin is coagulated. Since aggregates hinder permeation of the color material into the recording medium, it is considered that an excellent image is obtained from a point of improving image quality of the recorded image.

Examples of the coagulant include a polyvalent metal salt, a cationic polymer, and organic acid. The coagulant may be singly used or may be used in combination of two kinds or more thereof. Among the coagulants, from a point of excellent reactivity with the resin included in the aqueous ink jet composition, at least one kind of coagulant selected from the group including the polyvalent metal salt and the cationic polymer is preferably used.

The polyvalent metal salt is a compound which is configured with divalent or higher polyvalent metal ions and anions bonded to the polyvalent metal ions and is soluble in water. Specific examples of the polyvalent metal ions include divalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$. As the anions, Cl—, I—, Br—, $SO_4^{2-}$, $ClO_3^-$, $NO_3^-$, HCOO—, and CH3COO— are exemplified. Among the polyvalent metal salts, from a viewpoint of stability of the reaction solution or reactivity as the coagulant, a calcium salt and a magnesium salt are preferable.

Examples of the organic acid suitably include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridine carboxylic acid, coumarinic acid, thiophene carboxylic acid, nicotinic acid, derivatives of the above compounds, and salts thereof. The organic acid may be singly used or may be used in combination of two kinds or more thereof.

Examples of the cationic polymer include a cationic urethane resin, a cationic olefin resin, and a cationic allylamine resin.

As the cationic urethane resin, well-known materials can be appropriately selected and used.

Commercial products can be used as the cationic urethane resin. For example, HYDRAN CP-7010, CP-7020, CP-7030, CP-7040, CP-7050, CP-7060, and CP-7610 (above product names, manufactured by DIC Corporation), SUPERFLEX 600, 610, 620, 630, 640, and 650 (above product names, manufactured by DKS Co., Ltd.), and urethane emulsion WBR-2120C and WBR-2122C (above product names, manufactured by TAISEI FINE CHEMICAL CO., LTD.) can be used.

The cationic olefin resin has olefin such as ethylene or propylene, in a structural skeleton. Well-known materials can be appropriately selected and used. The cationic olefin resin may be in an emulsion state of being dispersed in a solvent including water or an organic solvent. Commercial products can be used as the cationic olefin resin. For example, A-BASE CB-1200 and CD-1200 (above product names, manufactured by Unitika Ltd.) are exemplified.

As the cationic allylamine resin, well-known materials can be appropriately selected and used. Examples of the cationic allylamine resin can include polyallylamine hydrochloride, polyallylamine amide sulfate, allylamine hydrochloride.diallylamine hydrochloride copolymers, allylamine acetate.diallylamine acetate salt copolymers, allylamine acetate.diallylamine acetate salt copolymers, allylamine hydrochloride.dimethylallylamine hydrochloride copolymers, allylamine.dimethylallylamine copolymers, polydiallylamine hydrochloride, polymethyldiallylamine hydrochloride, polymethyldiallylamine amide sulfate, polymethyldiallylamine acetate, polydiallyl dimethyl ammonium chloride, diallylamine acetate.sulfur dioxide copolymers, diallyl methylethyl ammonium ethyl sulfate-.sulfur dioxide copolymers, methyldiallylamine hydrochloride.sulfur dioxide copolymer, diallyl dimethyl ammonium chloride.sulfur dioxide copolymers, and diallyl dimethyl ammonium chloride.acrylamide copolymers. Commercial products can be used as such a cationic allylamine resin. For example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (above product names, manufactured by NITTOBO MEDICAL CO., LTD.), HiMO Neo-600, HIMOLOC Q-101, Q-311, and Q-501, and HiMAX SC-505 and SC-505 (above product names, manufactured by HYMO CORPORATION.) can be used.

In addition, a cationic surfactant can also be used. Examples of the cationic surfactant include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, and imidazolinium salts. Specific examples of the cationic surfactant include hydrochloride of lauryl amine, yashiamin, and rosin amine, acetates, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

Concentration of the coagulant in the reaction solution may be equal to or greater than 0.03 mol/kg with respect to 1 kg of the reaction solution. The concentration thereof may be from 0.1 mol/kg to 1.5 mol/kg and may be from 0.2 mol/kg to 0.9 mol/kg, with respect to 1 kg of the reaction solution.

For example, the content of the coagulant may be from 0.1 mass % to 25 mass %, from 0.2 mass % to 20 mass %, and from 0.3 mass % to 10 mass %, with respect to the total mass (100 mass %) of the reaction solution.

1.3.2. Water

The reaction solution used in the exemplary embodiment preferably uses water as the main solvent. The water is a component which is evaporated and dispersed by drying after the reaction solution is applied to the recording medium. As the water, ion exchanged water, ultrafiltered water, reverse osmosis water, pure water such as distilled water, or water (such as ultra pure water) obtained by strictly removing ionic impurities is preferable. If water sterilized by UV irradiation, addition of hydrogen peroxide, or the like is used, it is possible to suppress molds or bacteria in a case where the reaction solution is stored for a long term. Thus, this is preferable. The content of water included in the reaction solution can be set to be equal to or greater than 40 mass %, for example, with respect to the total mass (100 mass %) of the reaction solution. The content of water included in the reaction solution is preferably equal to or greater than 50 mass %, more preferably equal to or greater than 55 mass %, and further preferably equal to or greater than 65 mass %.

1.3.3. Organic Solvent

The reaction solution used in the exemplary embodiment may contain the organic solvent. Since the reaction solution contains the organic solvent, it is possible to improve wettability of the reaction solution into a recording medium. As the organic solvent, a solvent which is similar to the organic solvent exemplified in the section of the above-described aqueous ink jet composition can be used. The content of the organic solvent is not particularly limited and can be set to be from 1 mass % to 40 mass %, for example, with respect to the total mass (100 mass %) of the reaction solution. The content of the organic solvent is preferably from 5 mass % to 30 mass %.

Similar to the above-described aqueous ink jet composition, in the reaction solution, for the organic solvent, the content of a water-soluble organic solvent having a standard boiling point of higher than 280° C. is preferably equal to or smaller than 3 mass %, more preferably equal to or smaller than 1 mass %, and further preferably equal to or smaller than 0.5 mass %.

In this case, since dryability of the reaction solution is good, the reaction solution is quickly dried, stickiness of the obtained recorded matter is reduced, and abrasion resistance thereof is excellent.

1.3.4. Surfactant

The surfactant may be added to the reaction solution used in the exemplary embodiment. Since the surfactant is added, it is possible to reduce surface tension of the reaction solution and to improve wettability into a recording medium. Among surfactants, for example, the acetylene glycol-based surfactant, the silicone-based surfactant, and the fluorine-based surfactant can be preferably used. Regarding specific examples of the surfactants, surfactants which are similar to the surfactant exemplified in a section of the aqueous ink jet composition (which will be described later) can be used. The content of the surfactant is not particularly limited and can be set to be from 0.1 mass % to 1.5 mass %, for example, with respect to the total mass (100 mass %) of the reaction solution.

1.3.5. Other Components

If desired, a pH adjuster, an antiseptic agent or antifungal agent, a rust inhibitor, and a chelating agent may be added to the reaction solution used in the exemplary embodiment.

1.3.6. Preparing Method of Reaction Solution

The reaction solution used in the exemplary embodiment can be produced by dispersing and mixing the above-described components with a proper method. After the components are sufficiently stirred, filtration for removing coarse particles and foreign matters as the cause of clogging is performed, and thereby a desired reaction solution can be obtained.

1.3.7. Physical Properties of Reaction Solution

In a case where the reaction solution used in the exemplary embodiment is discharged by the ink jet head, the surface tension of the reaction solution at 20° C. is preferably from 20 mN/m to 40 mN/m, and more preferably from 20 mN/m to 35 mN/m. The surface tension can be measured, for example, by using an automatic surface tension meter CBVP-Z (product name, manufactured by Kyowa Interface Science Co., LTD.) and by confirming surface tension when a platinum plate is wet with the reaction solution under an environment of 20° C.

From a similar viewpoint, viscosity of the reaction solution used in the exemplary embodiment, at 20° C., is preferably from 3 mPa·s to 10 mPa·s, and more preferably from 3 mPa·s to 8 mPa·s. The viscosity can be measured under an environment of 20° C., for example, by using a viscoelasticity testing machine MCR-300 (product name, manufactured by Pysica Corporation).

1.4. Recording Medium

The above-described aqueous ink jet composition has ink dryability. In particular, when recording is performed on a recording medium having ink non-absorbency or low ink absorbency, the aqueous ink jet composition is preferably used because it is possible to obtain an image having excellent abrasion resistance.

Examples of the recording medium having ink non-absorbency include plastic films which are used for ink jet recording and are not surface-treated (that is, an ink absorption layer is not formed), a medium obtained by coating a base such as paper with plastic, and a medium to which a plastic film is bonded. As the plastic referred here, polyvinyl chloride, polyethylene terephthalate, polycarbonate, polystyrene, polyurethane, polyethylene, and polypropylene are exemplified. As the recording medium having low ink absorbency, actual printing paper such as art paper, coated paper, or matte paper is exemplified. In this specification, the recording medium having ink non-absorbency or low ink absorbency is simply referred to as "a plastic medium".

Here, in this specification, "the recording medium having ink non-absorbency or low ink absorbency" means "a recording medium having a water-absorbed amount which is equal to or smaller than 10 mL/m2 from a contact start to 30 msecl/2 in a Bristow method". The Bristow method is the most popular method as a method of measuring an amount of the absorbed liquid for a short time. The Bristow method is also employed in Japanese Technical Association of Pulp and Paper Industry (JAPAN TAPPI). Details of a test method are described in "Paper and cardboard-liquid absorption test method-Bristow method" Volume No. 51 of "JAPAN TAPPI Paper and Pulp test method, 2000".

Examples of the recording medium having ink non-absorbency include plastic films which do not have an ink absorption layer, a medium obtained by coating a base such as paper with plastic, and a medium to which a plastic film is bonded. As the plastic referred here, polyvinyl chloride, polyethylene terephthalate, polycarbonate, polystyrene, polyurethane, polyethylene, and polypropylene are exemplified.

As the recording medium of the low ink absorbency, a recording medium in which a coating layer for accepting an ink is provided on the surface. For example, as the medium in which the base is paper, actual printing paper such as art paper, coated paper, or matte paper is exemplified. In a case where the base is a plastic film, a medium in which a hydrophilic polymer is applied onto the surface of polyvinyl chloride, polyethylene terephthalate, polycarbonate, polystyrene, polyurethane, polyethylene, or polypropylene, and a medium in which particles of silica, titanium and the like are applied along with a binder are exemplified. The recording medium may be a transparent recording medium.

A recording medium such as an embossed medium, which has unevenness on the surface and has ink non-absorbency or low ink absorbency can also be suitably used.

2. Ink Jet Recording Method

The ink jet recording method according to the exemplary embodiment includes the reaction-solution applying step of applying (applying) the reaction solution containing the coagulant for coagulating the components of the ink composition onto a recording medium, and the ink-composition applying step of applying (applying) the ink composition onto the recording medium by discharging the ink composition from the ink jet head. The ink composition is the aqueous ink jet composition which contains the first wax having a melting point of 100° C. or higher, the second wax having a melting point of 70° C. or lower, and water. The ink jet recording method according to the exemplary embodiment will be described below with reference to the drawings.

2.1. Reaction-Solution Applying Step

The reaction-solution applying step is a step in which the reaction solution containing the coagulant for coagulating the components of the ink composition is applied onto a recording medium. Since the reaction solution containing the coagulant for coagulating the components of the ink composition is applied onto the recording medium before the ink composition is applied, it is possible to record an image having excellent abrasion resistance.

A recording medium M is preferably heated by the preheater 7 illustrated in the FIGURE before the reaction-solution applying step or by the IR heater 3 or the platen heater 4 illustrated in the FIGURE at a time of the reaction-solution applying step. Since the reaction solution is applied onto the heated recording medium M, the reaction solution discharged onto the recording medium M is easily spread on the recording medium M, and thus uniform coating can be performed. Therefore, the ink applied in the ink-composition applying step (which will be described later) sufficiently reacts with the reaction solution, and thus excellent image quality is obtained. Since the reaction solution is uniformly applied on the recording medium M, it is possible to reduce the coating amount. Therefore, it is possible to prevent the decrease of abrasion resistance of the obtained image.

Here, the surface temperature of the recording medium M when the reaction solution is applied is preferably from 30° C. to 55° C., more preferably from 35° C. to 50° C., and further preferably from 40° C. to 45° C. In a case where the temperature of the recording medium M when the reaction solution is applied is in the above range, it is possible to uniformly apply the reaction solution onto the recording medium M, and to improve image quality. It is possible to reduce the negative impact of heat being applied to the ink jet head 2.

The reaction solution may be applied by discharging of the ink jet head 2. As other methods, for example, a method of applying the reaction solution by a roll coater or the like, and a method of ejecting the reaction solution are exemplified.

2.2. Ink-Composition Applying Step

The ink-composition applying step is a step in which the above-described aqueous ink jet composition is discharged from the ink jet head 2 and applied to the recording medium after the reaction-solution applying step. With this step, liquid droplets of the ink composition react with the reaction solution on the recording medium M. Thus, an image formed of the ink composition is formed on the surface of the recording medium M. Since the reaction solution contains the coagulant, the coagulant reacts with the component of the ink on the recording medium M, and thus it is possible to more improve abrasion resistance.

Here, in the exemplary embodiment, "an image" means a recorded pattern formed by a dot group and includes text printing and a solid image. "The solid image" means a solid image pattern which is an image in which dots are recorded on all pixels as the minimum recording unit region defined by recording resolution and is generally an image in which a recording region of the recording medium is covered with an ink, and thus the background of the recording medium is not visible.

In the exemplary embodiment, the ink-composition applying step may be performed at the same time as the reaction-solution applying step.

The maximum applying amount of the aqueous ink jet composition to the recording medium M per unit area is preferably equal to or greater than 10 mg/inch2, more preferably equal to or greater than 12 mg/inch2, and particularly preferably equal to or greater than 13 mg/inch2. The upper limit of the applying amount of the aqueous ink jet composition to the recording medium M per unit area is not particularly limited. For example, 20 mg/inch2 is preferable.

The ink-composition applying step is preferably performed on the heated recording medium M. Thus, it is possible to dry an ink on the recording medium M quickly, and bleeding is suppressed. It is possible to provide an ink jet recording method in which an image which is excellent in abrasion resistance and glossiness can be formed and discharge stability is excellent.

The surface temperature (primary heating temperature) of the recording medium M when the ink is applied is preferably equal to or lower than 80° C., more preferably equal to or lower than 45° C., further preferably equal to or lower than 40° C., and particularly preferably equal to or lower than 38° C. Since the surface temperature of the recording medium when the ink is applied is in the above range, it is possible to suppress the negative impact of heat being applied to the ink jet head 2 and to prevent the nozzles from clogging. The lower limit value of the surface temperature of the recording medium M in ink jet recording is preferably equal to or higher than 30° C., more preferably equal to or higher than 31° C., and further preferably equal to or higher than 32° C. Since the lower limit value of the surface temperature of the recording medium M in ink jet recording is equal to or higher than 30° C., it is possible to dry the ink on the recording medium M quickly and to form an image in which bleeding is suppressed, and abrasion resistance and glossiness are excellent.

Here, regarding a heating temperature of the recording medium M in the ink-composition applying step, a portion of the wax may start to be softened even though the heating temperature is lower than the melting point of the wax, or a portion of the wax may be not completely dissolved even though the heating temperature is higher than the melting point of the wax. Therefore, the melting point of the wax and the heating temperature of the recording medium M are not limited to a relationship which is simply referred to as high and low.

2.3. Post-Heating Step (Secondary Heating Step)

The ink jet recording method according to the exemplary embodiment may include a post-heating step after the ink-composition applying step. In the post-heating step, the recording medium M to which the aqueous ink jet composition is applied is heated by the curing heater 5 illustrated in the FIGURE. Thus, the resin fine particles or the waxes included in the aqueous ink jet composition on the recording medium M are melted, and thereby an ink film is formed. In this manner, the ink film is firmly fixed (bonded) on the recording medium M, and thus it is possible to obtain an image which has excellent abrasion resistance and high image quality, in a short time.

The temperature (secondary heating temperature) when the surface of the recording medium M is heated by the curing heater 5 is preferably from 40° C. to 120° C., more preferably from 60° C. to 100° C., and further preferably from 80° C. to 90° C. Since the heating temperature is in the above range, it is possible to more improve abrasion resistance of the recorded matter obtained, and to form an ink film on the recording medium M with high adhesiveness.

It is preferable that the surface temperature of the recording medium M in the post-heating step be lower than the melting point of the first wax and higher than the melting point of the second wax. It is more preferable that the surface temperature of the recording medium M be lower than the melting point of the first wax by 10° C. or lower, and be higher than the melting point of the second wax by 10° C. or higher. It is further preferable that the surface temperature of the recording medium M be lower than the melting point of the first wax by 20° C. or lower and be higher than the melting point of the second wax by 20° C. or higher. In the ink jet recording method according to the exemplary embodiment, since the surface temperature of the recording medium M in the post-heating step is in the above range, the first wax is not dissolved even in the post-heating step after recording, but the second wax is dissolved in the post-heating step. Thus, the second wax encloses the first wax, and thus abrasion resistance and glossiness of the obtained image are improved.

After the post-heating step, a step of cooling the ink composition on the recording medium M by the cooling fan 6 illustrated in the FIGURE may be provided.

As described above, in the ink jet recording method according to the exemplary embodiment, since the ink composition contains the first wax having a melting point of 100° C. or higher and the second wax having a melting point of 70° C. or lower, an image having excellent abrasion resistance is obtained. Since the melting point of the second wax is equal to or lower than 70° C., it is presumed that the second wax is in a state of being not yet dissolved at a time of recording, but, in the post-heating step after the recording, the second wax is dissolved and acts to enclose the first wax.

Therefore, it is possible to provide an ink jet recording method in which abrasion resistance and glossiness of the obtained image are improved, clogging of the ink jet head 2 by dissolving the wax during the recording is prevented, and discharge stability is excellent.

3. Examples

The exemplary embodiment of the invention will be more specifically described below by using examples and comparative examples. However, the invention is not limited only to the examples.

3.1. Preparation of Ink Composition

Color inks 1 to 12 were obtained by mixing and stirring components so as to obtain a mixing ratio in Table 1. All numerical values in Table 1 indicate mass %. Pure water was added such that the total mass of the ink composition was 100 mass %.

TABLE 1

|  | COLOR INK 1 | COLOR INK 2 | COLOR INK 3 | COLOR INK 4 | COLOR INK 5 | COLOR INK 6 |
| --- | --- | --- | --- | --- | --- | --- |
| PB15-3 PIGMENT | 4.0 | 4.0 | 4.0 | 4.0 | 4.0 | 4.0 |
| 1,2-HEXANE DIOL | 5.0 | 5.0 | 5.0 | 5.0 | 5.0 | 5.0 |
| PROPYLENE GLYCOL | 5.0 | 5.0 | 5.0 | 5.0 | 5.0 | 5.0 |
| 2-PYRROLIDINE | 10.0 | 10.0 | 10.0 | 10.0 | 10.0 | 10.0 |
| GLYCERIN |  |  |  |  |  |  |
| BYK348 | 1.0 | 1.0 | 1.0 | 1.0 | 1.0 | 1.0 |
| DF110D | 0.5 | 0.5 | 0.5 | 0.5 | 0.5 | 0.5 |
| STYRENE ACRYLIC RESIN | 3.0 | 3.0 | 3.0 | 3.0 | 3.0 | 3.0 |
| WAX 1 | 1.0 |  |  |  |  |  |
| WAX 2 |  | 1.0 |  |  |  |  |
| WAX 3 |  |  | 1.0 |  |  |  |
| WAX 4 |  |  |  | 1.0 |  |  |
| WAX 5 |  |  |  |  | 1.0 |  |
| WAX 6 |  |  |  |  |  | 1.0 |
| WAX 7 |  |  |  |  |  |  |
| WAX 8 |  |  |  |  |  |  |

TABLE 1-continued

| | COLOR INK 7 | COLOR INK 8 | COLOR INK 9 | COLOR INK 10 | COLOR INK 11 | COLOR INK 12 |
|---|---|---|---|---|---|---|
| WAX 9 | | | | | | |
| WAX 10 | | | | | | |
| PURE WATER | REMAINDER | REMAINDER | REMAINDER | REMAINDER | REMAINDER | REMAINDER |
| TOTAL | 100.0 | 100.0 | 100.0 | 100.0 | 100.0 | 100.0 |

| | COLOR INK 7 | COLOR INK 8 | COLOR INK 9 | COLOR INK 10 | COLOR INK 11 | COLOR INK 12 |
|---|---|---|---|---|---|---|
| PB15-3 PIGMENT | 4.0 | 4.0 | 4.0 | 4.0 | 4.0 | 4.0 |
| 1,2-HEXANE DIOL | 5.0 | 5.0 | 5.0 | 5.0 | 5.0 | 5.0 |
| PROPYLENE GLYCOL | 5.0 | 5.0 | 5.0 | 5.0 | 5.0 | 5.0 |
| 2-PYRROLIDINE | 10.0 | 10.0 | 10.0 | 10.0 | 10.0 | 10.0 |
| GLYCERIN | | | | | 3.0 | 3.0 |
| BYK348 | 1.0 | 1.0 | 1.0 | 1.0 | 1.0 | 1.0 |
| DF110D | 0.5 | 0.5 | 0.5 | 0.5 | 0.5 | 0.5 |
| STYRENE ACRYLIC RESIN | 3.0 | 3.0 | 3.0 | 3.0 | 3.0 | 3.0 |
| WAX 1 | | | | | 1.0 | |
| WAX 2 | | | | | | |
| WAX 3 | | | | | | |
| WAX 4 | | | | | | |
| WAX 5 | | | | | | |
| WAX 6 | | | | | | |
| WAX 7 | 1.0 | | | | | |
| WAX 8 | | 1.0 | | | | 1.0 |
| WAX 9 | | | 1.0 | | | |
| WAX 10 | | | | 1.0 | | |
| PURE WATER | REMAINDER | REMAINDER | REMAINDER | REMAINDER | REMAINDER | REMAINDER |
| TOTAL | 100.0 | 100.0 | 100.0 | 100.0 | 100.0 | 100.0 |

The materials to be used are as follows.

Pigment
  PB15:3 (manufactured by DAINICHISEIKA COLOR & CHEM MFG CO., LTD., product name of "CHROMOFINE", C.I. Pigment Blue 15:3)

Surfactant
  BYK348 (product name, manufactured by BYK Additives & Instruments Corporation, silicone-based surfactant)
  DF110D (product name of "SURFYNOL DF110D", manufactured by Air Products and Chemicals, Inc., acetylene glycol-based surfactant)

Resin
  Styrene.acrylic resin (product name of "UF-5022", manufactured by TOAGOSEI CO., LTD., Tg of 75° C., as the solid content)

As waxes 1 to 10, waxes described in Table 2 were used. Specifically, Waxes 1 to 4, 7, and 9 are mixed waxes configured by two kinds of waxes. Waxes 5, 6, 8, and 10 are configured by only one kind of wax. AQUACER539 (AQ539) manufactured by BYK Corporation was used as Wax 5. AQUACER593 (AQ593) manufactured by BYK Corporation was used as Wax 6. Melting points of other waxes were adjusted by changing the molecular weight or the kind of the component of the wax. Regarding Waxes 1 to 4, 7, and 9 configured by two kinds of waxes, mixed wax emulsion was obtained by mixing two kinds of wax liquids having different melting points.

TABLE 2

| | Type (high melting point + low melting point) | High melting point (° C.) | Low melting point (° C.) | Material ratio High melting point/low melting point |
|---|---|---|---|---|
| Wax 1 | Polyethylene wax + polyethylene wax | 130 | 44 | 0.5 |
| Wax 2 | Polyethylene wax + polyethylene wax | 135 | 63 | 0.5 |
| Wax 3 | Polyethylene wax + paraffin | 130 | 50 | 0.3 |
| Wax 4 | Polyethylene wax + polyethylene wax | 110 | 60 | 0.5 |
| Wax 5 | Paraffin wax | 90 | — | |
| Wax 6 | Polypropylene wax | 160 | — | |
| Wax 7 | Paraffin + paraffin | 90 | 44 | 0.5 |
| Wax 8 | Paraffin | | 44 | |
| Wax 9 | Polyethylene wax + paraffin | 110 | 90 | 0.5 |
| Wax 10 | Polyethylene wax | 110 | | |

3.2. Preparation of Reaction Solution

The components were mixed and stirred in accordance with the composition described in Table 3. Then, the resultant was filtered by a membrane filter of 10 μm, and thereby Reaction solutions 1 and 2 were prepared. All numerical values in Table 3 indicate mass %. Pure water was added such that the total mass of the reaction solution was 100 mass %.

TABLE 3

| | Reaction solution 1 | Reaction solution 2 |
|---|---|---|
| Magnesium sulfate | 6% | |
| Polyarylamine | | 6% |
| 1,2-hexane diol | 5% | 5% |
| 2-pyrrolidone | 15% | 15% |
| BYK348 | 1% | 1% |
| Pure water | Remainder | Remainder |
| Total | 100 | 100 |

Details of the components described in Table 3 are as follows.

Coagulant
  Polyallylamine (PAA-01, manufactured by NITTOBO MEDICAL CO., LTD., 15% solid content)
Surfactant
  BYK348 (product name, manufactured by BYK Additives & Instruments Corporation, silicone-based surfactant)

3.3. Evaluation Test
3.3.1. Recording Test

A recording medium was carried into a modified device of an ink jet printer (product name of "SC-530650", manufactured by Seiko Epson Corporation), and a head was filled with the color ink and the reaction solution. Firstly, the reaction solution was subjected to ink jet coating at resolution of 1440×1440 dpi with an applied amount of 10.0 mg/inch2. Then, the recording medium was rewound, and ink jet coating was performed at resolution of 1440×1440 dpi with an applied amount of the ink of 1.0 mg/inch2, so as to overlap a reaction solution layer. When ink jet coating was performed, the platen heater was operated, and thus the reaction solution or the ink was applied to the heated recording medium. At this time, the platen heater was controlled to cause the surface temperature of the recording medium to be a primary heating temperature described in Table 4. After the recording, the recording medium was discharged from the printer, and drying was performed at the secondary heating temperature in Table for 2 minutes. As the recording medium, a glossy polyvinyl chloride sheet (manufactured by Roland Corporation, SV-G-1270G) was used.

TABLE 4

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| REACTION SOLUTION APPLYING PROCESS | REACTION SOLUTION 1 | REACTION SOLUTION 1 | REACTION SOLUTION 1 | REACTION SOLUTION 1 | REACTION SOLUTION 1 | REACTION SOLUTION 1 | REACTION SOLUTION 1 | REACTION SOLUTION 1 | REACTION SOLUTION 2 |
| INK COMPOSITE APPLYING PROCESS | COLOR INK 1 | COLOR INK 2 | COLOR INK 3 | COLOR INK 4 | COLOR INK 11 | COLOR INK 1 | COLOR INK 1 | COLOR INK 1 | COLOR INK 1 |
| PRIMARY HEATING TEMPERATURE ° C. | 40 | 40 | 40 | 40 | 40 | 80 | 40 | 35 | 35 |
| SECONDARY HEATING TEMPERATURE ° C. | 100 | 100 | 100 | 100 | 100 | 100 | 60 | 100 | 100 |
| DIFFERENCE OF SECOND WAX MELTING POINT FROM PRIMARY HEATING TEMPERATURE | 4 | 23 | 10 | 20 | 4 | −36 | 4 | 9 | 9 |
| ABRASION RESISTANCE | B | A | A | A | C | B | C | B | A |
| CLOGGING PROPERTY | C | B | C | B | A | D | C | A | A |
| IMAGE QUALITY | B | B | A | B | C | A | C | B | C |
| LIGHT GLOSSINESS | A | C | B | B | A | A | A | A | A |

|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|---|---|---|
| REACTION SOLUTION APPLYING PROCESS | REACTION SOLUTION 1 | REACTION SOLUTION 1 | REACTION SOLUTION 1 | REACTION SOLUTION 1 | REACTION SOLUTION 1 | REACTION SOLUTION 1 | REACTION SOLUTION 1 | — | — |
| INK COMPOSITE APPLYING PROCESS | COLOR INK 5 | COLOR INK 6 | COLOR INK 7 | COLOR INK 8 | COLOR INK 9 | COLOR INK 10 | COLOR INK 12 | COLOR INK 2 | COLOR INK 10 |
| PRIMARY HEATING TEMPERATURE ° C. | 40 | 40 | 40 | 40 | 40 | 40 | 40 | 40 | 40 |
| SECONDARY HEATING TEMPERATURE ° C. | 100 | 100 | 100 | 100 | 100 | 100 | 100 | 100 | 100 |
| DIFFERENCE OF SECOND WAX MELTING POINT FROM PRIMARY HEATING TEMPERATURE | — | — | 4 | 4 | 50 | — | 4 | 23 | — |
| ABRASION RESISTANCE | D | D | D | D | D | D | D | A | A |

TABLE 4-continued

| CLOGGING PROPERTY | B | A | B | D | B | A | A | B | A |
|---|---|---|---|---|---|---|---|---|---|
| IMAGE QUALITY | B | B | A | B | A | B | C | D | D |
| LIGHT GLOSSINESS | C | C | A | A | C | C | A | C | C |

3.3.2. Evaluation of Abrasion Resistance

A recorded matter obtained in the recording test was left in a laboratory under a condition of room temperature (25° C.) for one hour. Then, a peeled-off state of a recorded surface or an ink transfer state to a cotton cloth when the recorded surface of the recorded matter was rubbed 20 times under a load of 200 g by the cotton cloth was confirmed by using a school type friction fastness tester AB-301 (product name, manufactured by TESTER SANGYO CO., LTD.). Then, abrasion resistance was evaluated based on criteria as follows.

Evaluation Criteria

A: damage or separation does not occur.
B: damage or separation occurs in a region of 1% or smaller of a stroke area.
C: damage or separation occurs in a region of 1% or greater and smaller than 10% of the stroke area.
D: damage or separation occurs in a region of 10% of the stroke area.

3.3.3. Evaluation of Clogging Property (Discharge Stability)

Recording was continuously performed for one hour under the similar condition to that in the recording test. After the recording was ended, the number of nozzles at which the ink was not discharged (number of nozzles among 180 nozzles) was confirmed, and evaluation was performed based on criteria as follows.

Evaluation Criteria

A: the number of nozzles at which the ink has been not discharged (nozzle missing) is 0.
B: the number of nozzles at which the ink has been not discharged is from 1 to 5.
C: the number of nozzles at which the ink has been not discharged is from 6 to 20.
D: the number of nozzles at which the ink has been not discharged is equal to or greater than 21.

3.3.4. Evaluation of Image Quality (Coagulation Irregularity)

For evaluation of coagulation irregularity, a recorded matter which was similar to the recorded matter used in the abrasion resistance test was used. Coagulation irregularity of the ink in a solid pattern of the recorded matter was visually observed, and evaluation was performed based on evaluation criteria as follows. The evaluation was performed in a laboratory under a condition of room temperature (25° C.)

Evaluation Criteria

A: coagulation irregularity in the solid pattern is not recognized.
B: coagulation irregularity in the solid pattern is slightly recognized.
C: coagulation irregularity is overall recognized in the solid pattern.
D: flowing of the ink in the pattern toward the outside is viewed at the outline of the pattern, and a boundary is not linear, in addition to the criterion of C.

3.3.5. Evaluation of Glossiness

Glossiness (at 60°) of a recorded portion of the recorded matter obtained in 3.3.4. was measured by using a gloss meter (manufactured by KONICA MINOLTA, INC., MULTI Gloss 268). Evaluation was performed based on evaluation criteria as follows.

Evaluation Criteria

A: glossiness at 60° is equal to or larger than 80.
B: glossiness at 60° is 20 or larger and smaller than 80.
C: glossiness at 60° is smaller than 20.

3.4. Evaluation Results

Table 4 shows results of the evaluation tests.

Abrasion resistance was evaluated to be D in any of Comparative Examples 1 to 7 except for Comparative Examples and 9 in which the reaction solution was not used in recording. However, in any of Examples, abrasion resistance was evaluated to be C or higher, it was possible to form an image having excellent abrasion resistance, and the image was excellent in image quality or glossiness. In Comparative Examples 8 and 9 in which the reaction solution was not used in recording, the abrasion resistance of an image or the clogging property was excellent. However, since the reaction solution was not used, image quality was deteriorated in comparison to Example 2 or Comparative Example 6.

In Examples 1 to 4, abrasion resistance of the obtained image was improved, and it was hard to cause clogging to occur in a case where a difference between the melting point of the wax (second wax) having a low melting point, and the primary heating temperature was provided. However, an image having excellent glossiness was obtained in a case where the temperature of the melting point of the wax (second wax) having a low melting point was close to the primary heating temperature. In Example 3 in which the wax having a low melting point was a paraffin wax, image quality was enhanced than that in Examples 1, 2, and 4. In Example 5, glycerin having a high boiling point was provided. Thus, the clogging property or glossiness was excellent, but a result of abrasion resistance or image quality of the obtained image, which was deteriorated in comparison to Examples 1 to 4 was obtained.

With comparison of Examples 1 and 6 to 8, the clogging property was excellent in a case of the low primary heating temperature. Abrasion resistance, image quality, or glossiness of an image was excellent in a case of the high secondary heating temperature. With comparison of Examples 8 and 9, the followings were understood. Regarding Reaction solutions 1 and 2, the four evaluations were high. However, in order to obtain an image having enhanced image quality, it is preferable that the coagulant be a polyvalent metal salt. In order to obtain an image having enhanced abrasion resistance, it is preferable that the coagulant be a cationic polymer.

Among Comparative Examples 1 to 7, only one kind of wax was used in Comparative Examples 1, 2, 4, and 6. The melting point of the wax (first wax) having a high melting point was lower than 100° C. in Comparative Example 3. The melting point of the wax (second wax) having a low melting point was higher than 70° C. in Comparative Example 5. In any comparative example, abrasion resistance was deteriorated.

When heads in Example 6 and Comparative Example 4 in which the clogging property (discharge stability) was evaluated to be low were cut off and examined after the test, it was observed that the resin was dissolved and was applied to an inside of a pressurizing chamber. However, if cleaning was performed on the head in which a large number of nozzles were poor by suction, all nozzles were recovered.

With the above descriptions, in the example in which the reaction solution was used and the ink contained the first wax having a melting point of 100° C. or higher, the second wax having a melting point of 70° C. or lower, and water, a recorded matter having excellent abrasion resistance was obtained.

The invention is not limited to the above-described exemplary embodiment, and various modifications can be made. For example, the invention includes a configuration which is substantially the same as the configuration described in the exemplary embodiment (for example, configuration having the same function, method, and effects, or configuration having the same object and effects). The invention includes a configuration in which essential parts of the configuration described in the exemplary embodiment is substituted. The invention includes a configuration which exhibits the same advantageous effects as those of the configuration described in the exemplary embodiment, or a configuration which is capable of achieving the same object. The invention includes a configuration in which well-known technologies are added to the configuration described in the exemplary embodiment.

The entire disclosure of Japanese Patent Application No. 2017-052567 filed Mar. 17, 2017 is expressly incorporated herein by reference.

What is claimed is:

1. An ink jet recording method comprising:
    applying a reaction solution onto a recording medium, the reaction solution containing a coagulant configured to coagulate components of an ink composition; and
    applying the ink composition onto the recording medium having the reaction solution applied thereon, the ink composition being applied by discharging the ink composition from an ink jet head,
    wherein the ink composition is an aqueous ink jet composition which contains:
        a first wax emulsion having first wax particles that consist of a first wax having a melting point of 110° C. or higher;
        a second wax emulsion having second wax particles that consists of a second wax having a melting point of 50° C. or lower; and
        water.

2. The ink jet recording method according to claim 1, wherein the melting point of the first wax is from 110° C. to 150° C., and
    the melting point of the second wax is from 35° C. to 50° C.

3. The ink jet recording method according to claim 1, wherein a ratio of a content of the first wax to a content of the second wax in the aqueous ink jet composition is from 0.1 to 0.6.

4. The ink jet recording method according to claim 1, wherein the recording medium is a non-absorbency recording medium or a low absorbency recording medium.

5. The ink jet recording method according to claim 4, wherein the recording medium is in a heated state during the applying of the ink composition.

6. The ink jet recording method according to claim 5, wherein, in the heated state, a surface temperature of the recording medium is from 30° C. to 45° C.

7. The ink jet recording method according to claim 5, wherein the second wax has a melting point that is higher than a surface temperature of the recording medium in the heated state.

8. The ink jet recording method according to claim 7, wherein the melting point of the second wax is within 40° C. of the surface temperature of the recording medium in the heated state.

9. The ink jet recording method according to claim 5, further comprising:
    secondarily heating the recording medium after the applying of the ink composition.

10. The ink jet recording method according to claim 9, wherein the first wax has a melting point that is higher than a surface temperature of the recording medium during the secondarily heating of the recording medium.

11. The ink jet recording method according to claim 9, wherein the second wax has a melting point that is lower than a surface temperature of the recording medium during the secondarily heating of the recording medium.

12. The ink jet recording method according to claim 1, wherein the coagulant includes at least one of the group consisting of a polyvalent metal salt, a cationic polymer, and organic acid.

13. The ink jet recording method according to claim 1, wherein
    the recording medium is a non-absorbency recording medium or a low absorbency recording medium and the method further comprises:
    heating the recording medium to a heated state wherein a surface temperature of the recording medium is from 30° C. to 45° C.;
    applying the reaction solution onto the recording medium in the heated state; and
    discharging the aqueous ink jet composition from an ink jet head so as to apply the aqueous ink jet composition onto the recording medium in the heated state and having the reaction solution applied thereon,
    wherein the second wax has a melting point that is higher than the surface temperature of the recording medium in the heated state.

14. The ink jet recording method according to claim 13, wherein the melting point of the first wax is from 110° C. to 150° C., and
    the melting point of the second wax is from 35° C. to 50° C.

15. The ink jet recording method according to claim 13, wherein a ratio of a content of the first wax to a content of the second wax in the aqueous ink jet composition is from 0.1 to 0.6.

16. The ink jet recording method according to claim 13, further comprising:
    secondarily heating the recording medium after the applying of the aqueous ink jet composition.

17. The ink jet recording method according to claim 16, wherein the first wax has a melting point that is higher than the surface temperature of the recording medium during the secondarily heating of the recording medium.

18. The ink jet recording method according to claim 17, wherein the second wax has a melting point that is lower than the surface temperature of the recording medium during the secondarily heating of the recording medium.

19. The ink jet recording method according to claim 1, wherein the first wax has a melting point equal to or greater than 130° C.

* * * * *